United States Patent [19]
Glaude et al.

[11] 3,732,736
[45] May 15, 1973

[54] SYSTEM FOR ADSORPTION MEASUREMENT

[75] Inventors: Philemon Glaude, Groet; Walter Karcher, Alkmaar; Robert Smets, Groet, all of Netherlands

[73] Assignee: European Atomic Energy Community (Euratom), Luxembourg

[22] Filed: Dec. 4, 1970

[21] Appl. No.: 95,316

[30] Foreign Application Priority Data

Dec. 10, 1969 Luxembourg ............................ 59979

[52] U.S. Cl. ............................................... 73/432 PS
[51] Int. Cl. ............................................. G01n 15/08
[58] Field of Search .................... 73/432 PS, 38, 61 R

[56] References Cited

UNITED STATES PATENTS 3,555,912  1/1971  Lowell ............................... 73/432 PS
3,262,319  7/1966  Orr, Jr. et al. ..................... 73/432 PS
3,059,478  10/1962  Coggeshall et al. ............... 73/432 PS

FOREIGN PATENTS OR APPLICATIONS 1,202,540  10/1965  Germany .......................... 73/432 PS Primary Examiner—Louis R. Prince
Assistant Examiner—Joseph W. Roskos
Attorney—Stevens, Davis, Miller & Mosher

[57] ABSTRACT

The system measures by the adsorption of gas the specific surfaces of porous or divided solids. It injects equal quantities of adsorbate in stages into a sample-carrying chamber. These equal quantities of adsorbate come from a chamber of constant volume in which, before injection into the sample-carrying chamber, the adsorbate pressure is in each case equal to the pressure of equilibrium of the adsorption of the previous injection increased by a constant value.

7 Claims, 1 Drawing Figure

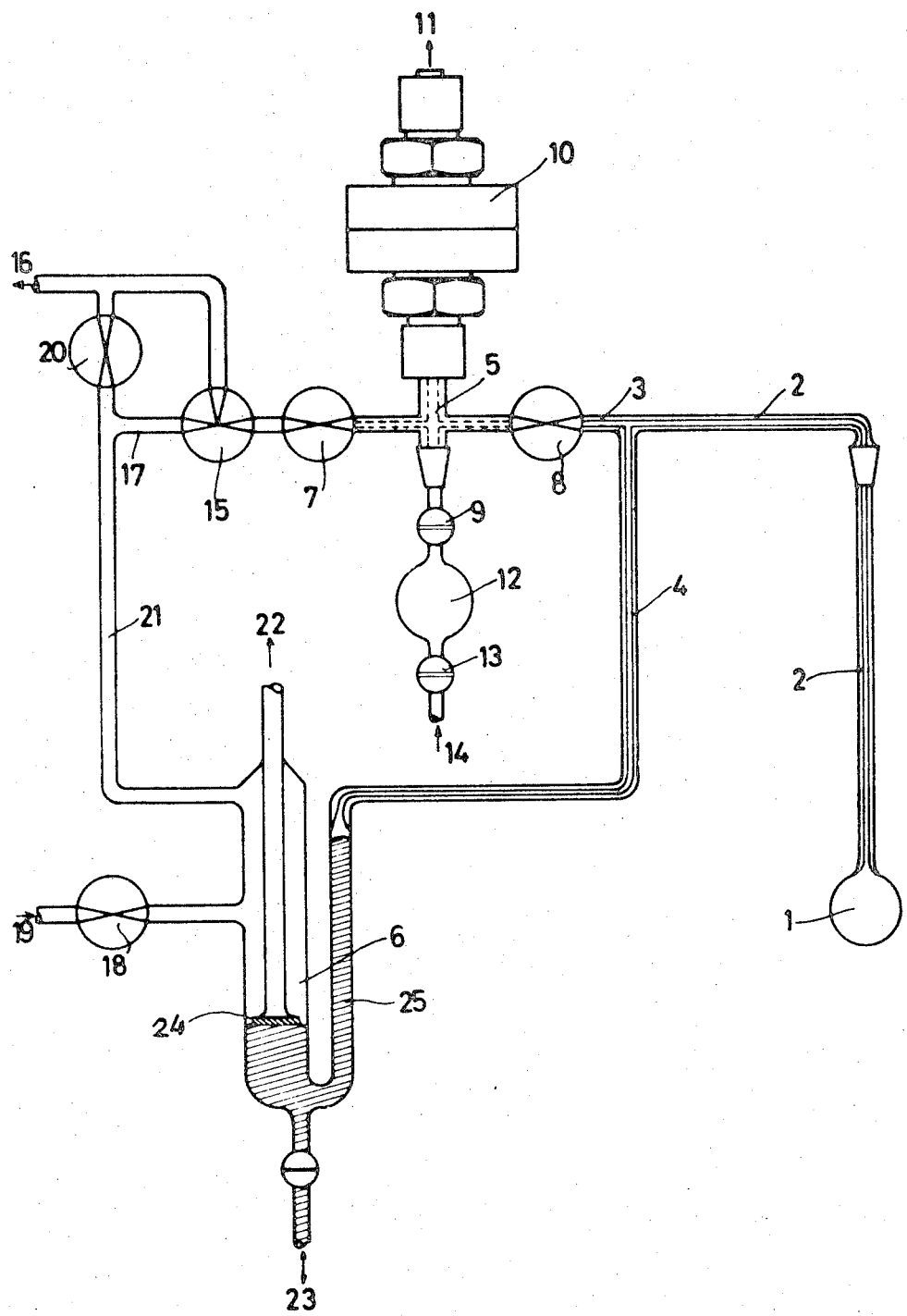

SYSTEM FOR ADSORPTION MEASUREMENT

This invention relates to a system for adsorption measurement.

When it is desired to characterize the texture of porous or divided solids, very valuable information is provided by measurements of specific surfaces and distributions of pore radii. Methods used include measurement of adsorption of gas at low temperature. This provides information on the distribution of the sizes of pores having radii between 20 and 350 A, the pore range to which BET surfaces are due. It also yields reproducible measurement results. That is why this method of measurement is the most widely used.

Various types of automatic systems for the measurement of adsorption are available on the market. They are one or other of the methods described below:

a. The dynamic volumetric method of adsorption. This enables small samples to be used, but has the disadvantage of recording non-stabilized equilibrium pressures, especially in the case of microporous substances.

b. The gravimetric method, which also enables small samples to be used. This comprises measuring the variation of the weight of the sample according to the pressure of the ambient adsorbate. The method has the disadvantage of measuring adsorption values that are systematically lower than those measured by volumetric methods. This difference is due to the difficulty of keeping the sample at the adsorption temperature.

c. The dynamic method of differential adsorption. The adsorbate is introduced continuously at known rates into two sample-carriers, one of which contains a reference substance (a non-porous substance of known surface). This method necessitates the use of large surfaces and has the disadvantage already mentioned for a dynamic method, i.e. of recording non-stabilized equilibrium pressures.

d. The static volumetric method. This is used in the system according to the present invention. It consists of injecting successive and equal quantities of adsorbate into the sample-carrying chamber. After each injection of adsorbate, the equilibrium pressure is allowed to establish itself and is then measured. Knowledge of the different successive equilibrium pressures during a complete cycle of adsorptions and desorptions enables the specific surface of the sample to be determined together with the distribution of pores having radii between 20 and 350 A by a calculation that can readily be carried out on a small office electronic computer.

According to the known method used hitherto, equal quantities of adsorbate are introduced into the sample-carrying chamber as follows. Adsorbate is injected into a cylindrical chamber at a constant pressure. When the chamber is filled with adsorbate, a plunger drives the latter from the chamber to the sample-carrying chamber. The disadvantage of this system is immediately apparent. It is impossible to ensure that the quantity of adsorbate injected into the sample-carrying chamber is exactly the same from one injection to the next. This is because the system is mechanical, the travel of the plunger varies a little on each occasion whatever precautions are taken, and impurities, for example air, can enter the adsorbate. Consequently, to minimize this lack of precision or the introduction of impurities, measurements can only be taken with large samples.

According to the present invention there is provided a system for measuring the adsorption of a gaseous adsorbate by an adsorbing substance using the static volumetric method of adsorption by successive stages, which system comprises the introduction of equal quantities of adsorbate into a sample-carrying chamber in successive stages, wherein said equal quantities of adsorbate are introduced to the sample-carrying chamber from a chamber of constant volume which is separated from the sample-carrying chamber by a valve, said valve being open during each stage to enable the pressures in the two chambers to be equilibrated and closed before the following stage to permit a rise of a predetermined constant value in the pressure of adsorbate in the constant volume chamber.

The system according to the present invention, as specifically exemplified hereafter, enables small samples to be used, weighing less than one gram. It enables very small and very exactly controlled and equal quantities of adsorbate of the order of 0.1 $cm^3$ NTP to be introduced into the sample-carrying chamber. The system according to the present invention is noteworthy in that these equal quantities of adsorbate come from a chamber of constant volume separated from the sample-carrying chamber by a valve, which is open during each stage and enables the pressures in the two chambers to be equilibrated and, closed before the next stage, permits a rise in the pressure of a predetermined constant value $\Delta p$ in the chamber of constant volume.

The invention will be understood better by means of the following text and with reference to the single FIGURE, which is a diagram by way of example of a specific system in accordance with the invention.

The FIGURE shows the sample-carrying chamber 1. This is cooled to the adsorption temperature by an appropriate means (not shown), which may be a simple Dewar device containing a cooling liquid whose level is kept constant. The chamber 1 is connected by capillaries 2, 3 and 4 to a chamber 5 of constant volume and to the reference part of a manostat 6 fitted as a differential pressure regulator. The chamber of constant volume 5 is bounded by three valves 7, 8 and 9 and by the diaphragm of a pressure pick-up 10, which is connected to a vacuum pump 11 (not shown). The latter is used for giving a constant pressure reference. Atmospheric pressure, which is variable, cannot be used as a pressure reference during measurement that may take 24 hours.

The valve 9 connects the chamber 5 to a calibrated space 12 into which there may be introduced, by means of a valve 13, a gas such as helium, which is brought from a source 14 (not shown). Determination of the volume of the chambers 5 and 1 together with the capillaries that connect them and the interior of the manostat 6 is effected by expansion of the helium in the calibrated space 12 to the chambers and capillaries. This volume is readily determined by means of the law pV - constant.

The valve 7 communicates with a three-way valve 15, which is connected to a vacuum pump 16 (not shown) and to the regulating part of the manostat via a duct 17. The adsorbate coming from a source 19 (not shown) is introduced into this part of the manostat through a valve 18. A sintered-glass plate 24 enables excess gas to escape into the pump 22 (not shown) without permitting the passage of the mercury 25. A mercury reservoir (not shown) communicates with a valve 23, enabling the selected $\Delta p$ to be adjusted or the mercury to be removed from the manostat on the degassing of the sample or when the system is no longer in use. The pressure difference $\Delta p$ is regulated by the height of the mercury column above its free level in the manostat 6.

The walls of the chamber 12 are advantageously made of transparent material. This makes it easy to check that no air bubbles are included in the liquid (which would falsify measurements) when the chamber is filled with liquid (which is weighed afterwards), in order to determine its volume with great precision.

The valves 7 and 8 are controlled by two clocks, which control each other in closed circuit, i.e. one is started when the other stops. Thus, these two valves are opened and closed automatically without the need for the presence of a human observer.

The system operates as follows. The adsorbate flows continuously into the space bounded by the valves 18, 20 and 7, in which a pressure higher by $\Delta p$ than the one in the chamber 1 is kept constant by means of the manostat. A vacuum having previously been produced in the chambers 1 and 5, the pressure of adsorbate is therefore equal to $\Delta p$. When the valve 7 is opened the chamber 5 is filled with adsorbate at that pressure $\Delta p$. When the valve 7 is closed and the valve 8 is opened the adsorbate in the chamber of constant volume flows towards the capillaries 3,4 and 2 and to the sample-carrying chamber 1, in which it is partly adsorbed by the sample. The quantity of adsorbate introduced into the adsorption-measuring part (chamber 5, capillaries 3,4 and 2 and chamber 1) during this first adsorption stage corresponds to the volume of the chamber of constant volume 5 at the pressure $\Delta p$. The valve 8 remains open during the time necessary for adsorption to be stabilized. The pressure in the chamber 1 then becomes $p_1$.

The pressure $p_1$ acting on the reference part of the manostat adjusts to $\Delta p + p_1$ the pressure of the adsorbate in the space bounded by the valves 18, 20 and 7. After the conclusion of the first adsorption stage the valve 8 is also closed. The valve 7 is then opened, and the chamber 5 is filled with adsorbate at the pressure $\Delta p + p_1$. The fresh quantity of adsorbate brought into the chamber 5 is therefore again that which corresponds to the volume (constant) of the chamber 5 at the pressure $\Delta p$. The valve 7 is then closed, and the valve 8 is opened. The same quantity of adsorbate then flows to the chamber 1, in which a new equilibrium pressure $p_2$ is established after a certain time of adsorption in the sample.

In the third stage adsorbate at the pressure $p_2 + \Delta p$ is introduced into the chamber 5 and from there to the chamber 1. The quantities of adsorbate introduced into the system are therefore the same at each stage. The succession of adsorption stages is controlled solely by the opening of closing of the valves 7 and 8. When their sequences of opening and closing are controlled by clocks as in a preferred embodiment of the invention, the presence of a human observer is no longer necessary.

The (predetermined) number of stages is controlled by any appropriate means, for example an electric counter. When this number is reached, the valve 15 (also controlled automatically) brings the space between the valves 7 and 15 into constant communication with the vacuum pump 16. Desorption then begins. The opening and closing cycle of the valves 7 and 8 begins again unchanged, and the succession of desorption stages proceeds by successive filling and emptying of desorbed gas.

During all these adsorption and desorption stages, the pressure in the chamber 5 or in the chambers 5 and 1 (together with the capillaries) brought into communication by opening the valve 8 is measured by the pressure pick-up 10. The temperature of the system is kept constant with an accuracy of $\pm$ 0.1°C.

The advantages of this system will be apparent from the above description. By using the chamber 5, the introduction of very small quantities of gas, which are exactly known and are equal, without the introduction of impurities, is possible in the chamber 1. This is because, apart from the valves 7 and 8, no moving parts are used in the system. Consequently, very small samples can be used, and accurate measurements can be taken on absolute surfaces ranging from 0.5 m$^2$ to several thousand square meters BET. Many types of adsorbate, in particular argon and nitrogen, may be used.

The disposition of the pressure pick-up in the chamber 5 enables the increases in pressure $\Delta p$ in that space to be recorded exactly and the equilibrium pressures of adsorption to be recorded as well. Thus, a single detector calibration curve is necessary, and the operator always has all the data he needs, hence complete recording of all the pressure variations of the adsorbate.

The signal from the pick-up may also be transmitted to a computer, which automatically makes calculations of the BET surface and the distribution of the pore sizes according to a predetermined program.

What we claim is:

1. Apparatus for measuring the adsorption of a gaseous adsorbate by an adsorbing sample using the static volumetric method of adsorption by successive stages, said apparatus comprising a chamber of constant volume, a sample carrying chamber a first valve connecting the two chambers, an adsorbate pressure controlling means, a second valve connecting the chamber of constant volume to the pressure controlling means, pressure pick-up means connected to said chamber of constant volume, and means for connecting a source of adsorbate to said pressure controlling means, the chamber of constant volume serving for the introduction of equal quantities of adsorbate into the sample carrying chamber when said first valve is open whereby the pressure of the two chambers are equilibrates, and after closing said first valve the pressure controlling means permitting the pressure of adsorbate in the chamber of constant volume to rise with a predetermined constant value if said second valve is open, the pressure pick-up means recording the pressure in the chamber of constant volume before and after an adsorbing operation.

2. Apparatus as claimed in claim 1, wherein the adsorbate pressure controlling means is a manostat operating as a differential pressure regulator, the reference part of which is connected to the sample carrying chamber whereas the regulating part permits the rise of pressure in the chamber of constant volume with said predetermined value.

3. Apparatus as claimed in claim 2, wherein the regulating part of the manostat communicates by means of a valve with the source of adsorbate and also with a T duct communicating, by means of a valve, with a vacuum pump and by means of a three-way valve, either with the vacuum pump or with the second valve bounding the entry to the chamber of constant volume.

4. Apparatus as claimed in claim 3, wherein all the ducts forming part of the sample carrying chamber are capillary tubes.

5. Apparatus as claimed in claim 4 including a calibrated space connected by means of a valve to the chamber of constant volume so as to determine the volume of the two chambers and the capillary tubes.

6. Apparatus as claimed in claim 5, including two clocks, interconnected for controlling the opening and closing of said first and said second valve.

7. Apparatus as claimed in claim 6, wherein the calibrated space, the manostat and the sample carrying chamber are made of transparent material.

* * * * *